H. W. STRUSS.

WIRE PACKAGE.

APPLICATION FILED JUNE 6, 1910.

Reissued July 9, 1912. 13,441.

WITNESSES:

G. V. Rasmussen

John A. Ahlenbach

INVENTOR

Henry W. Struss

BY

Wiesen & Kenneth

ATTORNEYS

UNITED STATES PATENT OFFICE.

HENRY W. STRUSS, OF NEW YORK, N. Y.

WIRE-PACKAGE.

13,441. Specification of Reissued Letters Patent. Reissued July 9, 1912.

Original No. 943,202, dated December 14, 1909, Serial No. 428,929. Application for reissue filed June 6, 1910. Serial No. 565,419.

*To all whom it may concern:*

Be it known that I, HENRY W. STRUSS, a citizen of the United States, and resident of the borough of Manhattan, city, county, and State of New York, have invented certain new and useful Improvements in Wire-Packages, of which the following is a specification.

My invention relates to packages for containing wire and more particularly round wire, and has for its object to provide a package in which such wire will be maintained in a single spiral coil or flat condition.

Reference is to be had to the accompanying drawings, in which—

Figure 1:
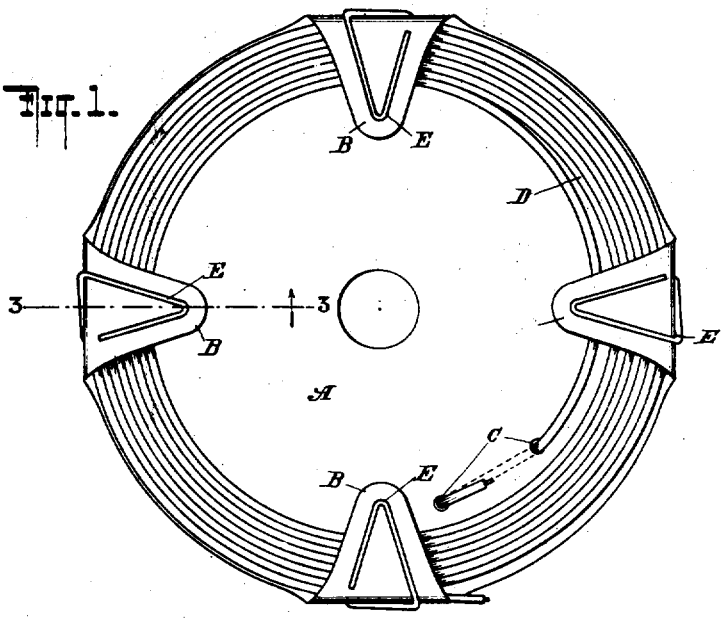
Figure 2:
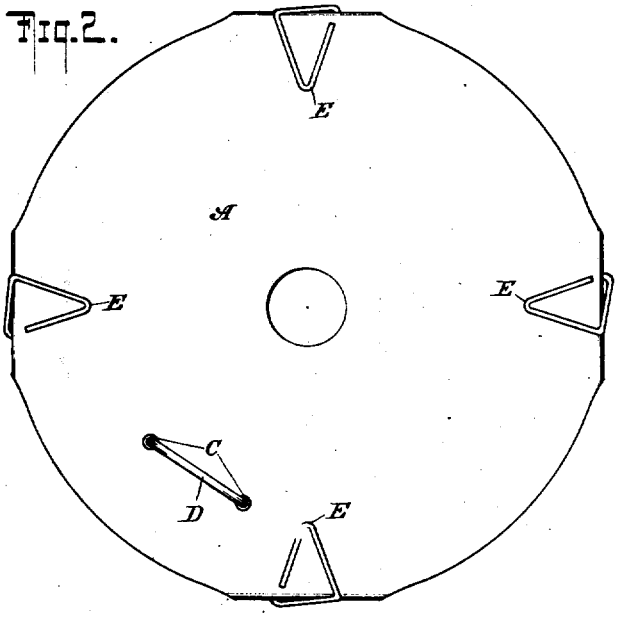
Figure 3:
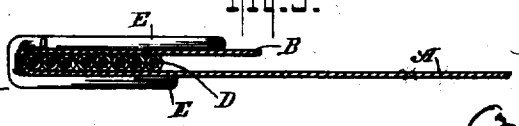

Figure 1 is a face view of my improved package with the wire in place. Fig. 2 is a rear view of the package and Fig. 3 is a sectional view thereof on lines 3—3 of Fig. 1.

A represents a circular back portion which is provided on its periphery with spaced flexible projections B. The said back portion A is provided with suitable openings C, which are adapted to receive one end of the wire D which is arranged in a single flat coil on the one surface of the back portion A. After the said wire has been so coiled the projections B are bent over the coiled wire as shown in Fig. 1 and are secured in this position by fastening devices E, which may be of the ordinary paper-clip description.

The resilient wire for which my package is devised, such as ordinary hat wire, has the property of exercising its inherent elasticity when coiled on a flat surface, not only in the direction of length but also in a direction away from the flat surface and such wires, when coiled in the usual fashion, will tend to form a circle of uniform diameter with the various thicknesses of wire bunched together and all at substantially the same distance from the center of the circle. By my invention, however, I am enabled to maintain said wire in a flat condition, with each thickness of the wire progressively at a greater distance from the center than the preceding thickness, thereby forming a close continuous spiral like the record line of a phonograph disk. The coils are all maintained in a flat condition and are prevented from being displaced from their position in the flat coil by the pressure exercised in a horizontal line upon both the upper and lower surfaces of said wire. By these means, the flat single coil is prevented from bending or twisting or becoming entangled.

My package forms a convenient means of shipment and also serves as a device for attractively displaying said braids or wires. By the use of my device, friction between the various coils of the braids in shipment or handling is almost entirely avoided and the luster or surface condition is consequently maintained. When such wires are wound into a coil in the usual fashion, on the other hand, the friction between the various coils and the fact that these coils do not lie in the same plane, tends to injure the braided or other effective surface condition.

While my invention and claims are restricted to a package for coiled wire, the coils of which all lie in the same plane but have a continuous tendency to leave said plane unless restrained, I intend that my claims shall include any obvious variations from the specific embodiment of the invention as illustrated in the drawings.

I claim:

1. A wire package comprising a coil of round resilient wire spirally coiled, the spirals being adjacent to one another and all lying in substantially the same plane, the various coils having a tendency, unless restrained, to leave said plane, a disk-like back portion, and means for exercising pressure upon the top and bottom surfaces of said flat coils, said means comprising clips, a portion of which confines the coils between it and the upper surface of the disk and another portion of which projects below and lies against the lower surface of the disk.

2. A wire package comprising a coil of round resilient wire spirally coiled, the spirals being adjacent to one another and all lying in substantially the same plane, the various coils having a tendency, unless restrained, to leave said plane, a disk like back portion, a protecting guard covering a portion of the top surface of said coil and means, adapted to press said guard upon said coil and to exercise pressure upon the top and bottom surfaces of said flat coils.

3. A wire package comprising a coil of resilient wire spirally coiled, the spirals being adjacent to one another and all lying in substantially the same plane, the various coils having a tendency, unless restrained, to leave said plane, a disk like back portion through which extends one end of the wire, said back portion being provided with spaced projections adapted to be bent over said wire, and clips adapted to be slipped over said projections exercising pressure upon the top and bottom surfaces of said flat coils.

4. A wire package comprising a coil of resilient wire spirally coiled, the spirals being adjacent to one another and all lying in substantially the same plane, the various coils having a tendency, unless restrained, to leave said plane, a disk like back portion provided with spaced projections adapted to be bent over said wire, and clips adapted to be slipped over said projections exercising pressure upon the top and bottom surfaces of said flat coils.

In testimony whereof, I have hereunto set my hand in the presence of two subscribing witnesses this 21st day of May, 1910.

HENRY W. STRUSS.

Witnesses:
JOHN A. KEHLENBECK.
M. H. LOCKWOOD.